United States Patent
Yarabolu et al.

(10) Patent No.: US 11,074,164 B1
(45) Date of Patent: Jul. 27, 2021

(54) REAL-TIME REGRESSION TEST GENERATOR

(71) Applicant: Bank of America Corporation, Charlotte, NC (US)

(72) Inventors: Vijay Kumar Yarabolu, Hyderabad (IN); Srinivas Akkaladevi, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/811,238

(22) Filed: Mar. 6, 2020

(51) Int. Cl.
*G06F 11/36* (2006.01)
*G06F 11/30* (2006.01)
*G06F 11/34* (2006.01)
*G06N 20/00* (2019.01)

(52) U.S. Cl.
CPC ........ *G06F 11/3684* (2013.01); *G06F 11/302* (2013.01); *G06F 11/3438* (2013.01); *G06N 20/00* (2019.01)

(58) Field of Classification Search
CPC .............. G06F 11/3684; G06F 11/302; G06F 11/3438; G06N 20/00
See application file for complete search history.

(56) References Cited

U.S. PATENT DOCUMENTS

| | | | |
|---|---|---|---|
| 7,873,944 B2 | 1/2011 | Bangel et al. | |
| 8,209,671 B2 | 6/2012 | Tateishi et al. | |
| 8,276,123 B1 * | 9/2012 | Deng | G06F 11/368 717/125 |
| 8,479,171 B2 * | 7/2013 | Ghosh | G06F 11/3684 717/131 |
| 8,589,884 B2 | 11/2013 | Gorthi et al. | |
| 8,806,450 B1 * | 8/2014 | Maharana | G06F 11/3688 717/133 |
| 9,069,898 B2 | 6/2015 | Nucci et al. | |
| 9,983,981 B1 | 5/2018 | Mundada et al. | |
| 10,108,533 B1 | 10/2018 | Parasuraman et al. | |
| 10,146,676 B1 | 12/2018 | Khanduri | |
| 10,303,587 B2 | 5/2019 | M et al. | |
| 10,394,830 B1 * | 8/2019 | Blair-Goldensohn | G06F 16/248 |
| 10,417,115 B1 * | 9/2019 | Klein | G06F 9/45512 |
| 2005/0050521 A1 * | 3/2005 | Chang | G06F 11/3688 717/124 |
| 2005/0166094 A1 * | 7/2005 | Blackwell | G06F 11/3688 714/38.14 |
| 2014/0130014 A1 * | 5/2014 | Jensen | G06F 11/3684 717/124 |

(Continued)

*Primary Examiner* — Daxin Wu
(74) *Attorney, Agent, or Firm* — Banner & Witcoff, Ltd.; Michael A. Springs (57) ABSTRACT

A regression test generator device configured for real-time monitoring of a user's interaction with an application running within a production environment and definition of a scope of regression testing to be carried out on one or more components of the application in response to changes made within a development environment. The regression test generator device identifies new user flows through an application, and stores the underlying software classes used to facilitate a given task associated with the new user flows. In addition, the regression test generator device monitors software classes changed in a development environment, and matches the changed software classes to one or more flows that are to be regression tested.

20 Claims, 5 Drawing Sheets

(56) References Cited

U.S. PATENT DOCUMENTS

| | | | |
|---|---|---|---|
| 2015/0254173 A1* | 9/2015 | Gupta | G06F 11/3688 714/38.1 |
| 2017/0098086 A1 | 4/2017 | Hoernecke et al. | |
| 2019/0034323 A1* | 1/2019 | M | G06F 8/75 |
| 2019/0087691 A1* | 3/2019 | Jelveh | G06K 9/6254 |
| 2019/0243751 A1* | 8/2019 | Ganda | G06F 11/3664 |

* cited by examiner

REAL-TIME REGRESSION TEST GENERATOR

TECHNICAL FIELD

Aspects of this disclosure generally relate to regression test generator devices. In particular, aspects of the disclosure relate a device that monitors user interactions with applications implemented within a production environment, and changes made to applications within a development environment, and defines a scope of regression testing to be carried out in response to the changes.

BACKGROUND

Regression testing is used to determine whether changes made to code have adversely affected the functionality of existing features of the code. However, changes to a code block or class may have widespread implications as that code block may be used or instantiated in multiple different parts of an application built using the code. Defining the scope, or extent to which an application should be tested to ensure existing functionality remains intact in response to introducing changes into the code can be a labor-intensive process or may unfeasible, given, in some instances, the complexity of code structures. Additionally, no device exists that accomplishes real-time regression scope definition.

BRIEF SUMMARY

In light of the foregoing background, the following presents a simplified summary of the present disclosure in order to provide a basic understanding of some aspects of the various implementations of this disclosure. This summary is not an extensive overview of the embodiments described herein. It is not intended to identify key or critical elements, or to delineate the scope of the embodiments described in this disclosure. The following summary merely presents some concepts of the embodiments of this disclosure in a simplified form as a prelude to the more detailed description provided below.

In one aspect, this disclosure relates to a regression test generator device that includes a deployment monitoring engine that is configured to monitor a user's interaction with a production environment of an application. The deployment monitoring engine may include an activity identification processor that is configured to identify a task that the user intends to carry out within the application, and a dependency processor. The dependency processor may be configured to identify dependent software classes utilized during the user's interaction with the production environment, determine whether a functional path followed through the identified software classes utilized during the user's interaction with the production environment is new, and store in a path array, in response to determining that the functional path is new, information about the functional path in combination with the task identified by the activity identification processor. The regression test generator device may additionally include a development monitoring engine that is configured to identify software classes utilized by a module being developed or changed and planned for integration into the application in the production environment. The regression test generator device additionally includes a regression scope engine. The regression scope engine may be configured to compare the software classes identified by the development monitoring engine to software classes in the path array, and define a scope of a regression test be carried out on the application in response to an identification of a match between software classes identified by the development monitoring engine and software classes stored in the path array.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Various connections between elements are discussed in the following description. It is noted that these connections are general and, unless otherwise specified, may be direct or indirect, wired or wireless, and that the specification is not intended to be limiting in this respect.

Figure 1:
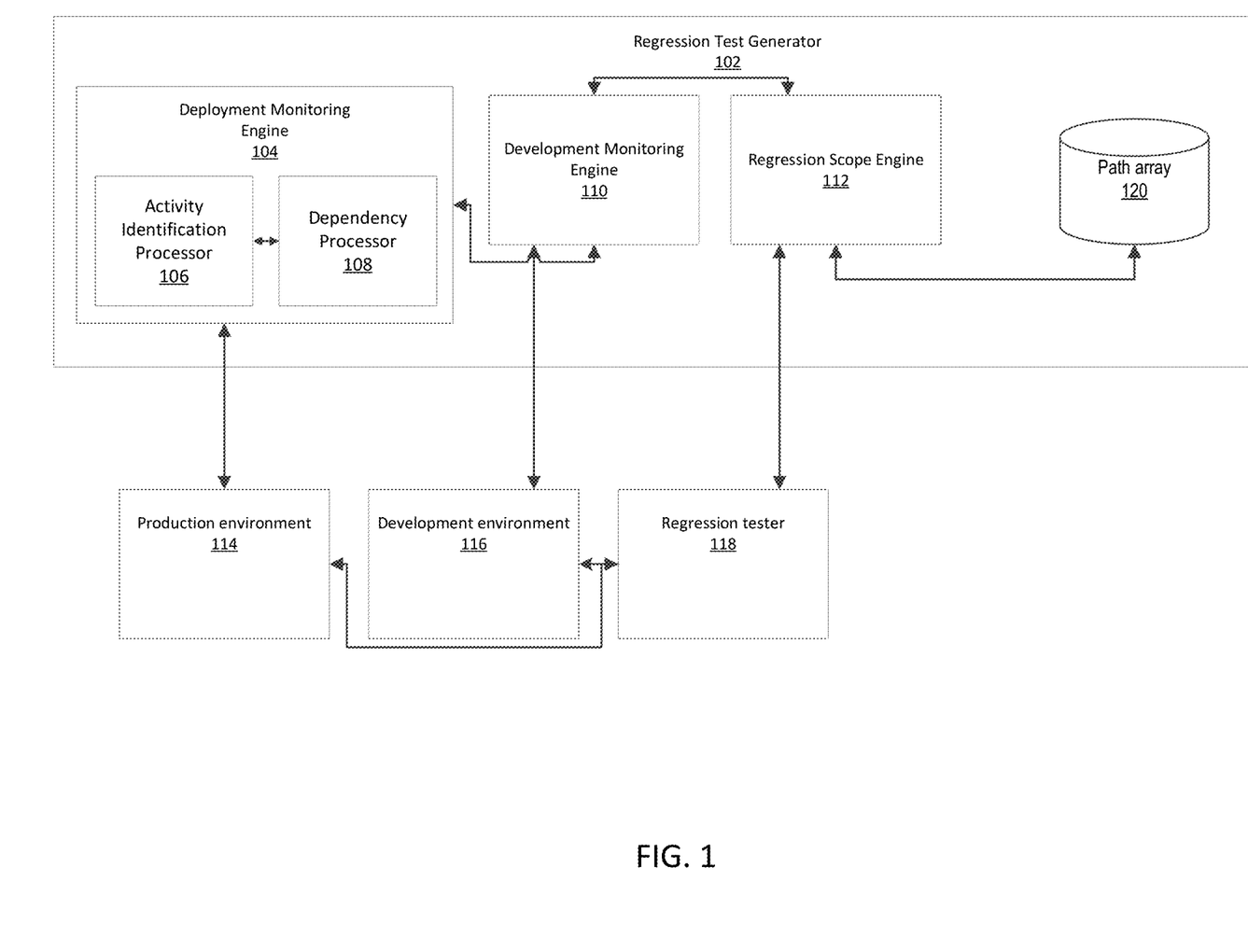
FIG. 1 schematically depicts a regression test generator device, according to one or more aspects described herein.

FIG. 1 schematically depicts a regression test generator device 102, according to one or more aspects described herein. It is contemplated that the regression test generator device 102 may be implemented as one or more hardware elements that include one or more application-specific integrated circuits. In other examples, the regression test generator device 102 may include software and/or firmware elements in order to implement the functionality described herein. Further examples of implementation solutions of the regression test generator device 102 are presented in proceeding sections of this disclosure.

The regression test generator device 102 may include a deployment monitoring engine 104. The deployment monitoring engine 104 may be configured to monitor user interaction with a production environment 114 associated with one or more applications. In one example, production environment 114 may include hardware, firmware, and/or software configured to host one or more applications with which one or more users interact. These one or more users may be co-located with the production environment 114, or may be distributed, and may access the production environment through one or more wired or wireless communication networks. It is contemplated that any implementation of production environment 114 may be used with the regression test generator device 102, including any combination of purpose-built and/or general-purpose hardware, firmware, and/or software using one or more computational processors or cores housed in one or more server devices. The production environment 114 may also be implemented using, among others, virtualization or container solutions. Further, the regression test generator device 102 may communicate with a production environment 114 from a remote location, or may be co-located with the production environment 114. It is further contemplated that the production environment 114 may facilitate a single application, or many instances of a same or different applications. The applications hosted and deployed within the production environment 114 may have any functionality, and may be accessed by one or more users across a private network, or through a wide area network, such as the Internet. It is further contemplated that the regression test generator 102 may be in operative communication with a single production environment 114, or multiple production environments, without departing from the scope of this disclosure.

The deployment monitoring engine 104 may include an activity identification processor 106 that is configured to identify a task that a user intends to carry out within an application running in the production environment 114. Accordingly, the activity identification processor 106 may monitor the user's interactions with an application and execute one or more processes to predict a task that a user intends to carry out. For example, the activity identification processor 106 may track a user's mouse movement, buttons with which the user interacts, text or numeric entries made by the user within the application, the addresses of one or more pages or interfaces with which the user interacts, among others. From this information, the activity identification processor 106 may determine one or more tasks that the user is trying to carry out within the application.

The deployment monitoring engine 104 may additionally include a dependency processor 108. The dependency processor 108 may be configured to identify dependent software classes utilized during the user's interaction with the production environment 114. Specifically, an application running within the production environment 114 may be built from various sub-components. These sub-components may utilize one or more software classes. Accordingly, the dependency processor 108 may monitor those software classes that a user accesses when interacting with the application running within the production environment 114. In one example, the dependency processor 108 receives information from the activity identification processor 106 identifying a predicted or an actual task that the user is carrying out within the application of the production environment 114. The dependency processor 108 may utilize this task information to identify dependent software classes utilized during the user's interaction with the application. In particular, the dependency processor 108 may determine a functional path that is followed through one or more software classes. This functional path may be based upon the user's actual interaction with the application within the production environment 114, or upon a predicted path associated with a prediction of a task or activity that a user intends to perform within an application, as identified by the activity identification processor 106.

The dependency processor 108 may additionally execute one or more processes to determine whether a functional path followed through the identified software classes utilized during the user's interaction with the production environment 114 represents a new path or a path already encountered by the dependency processor 108 during a previous interaction with the production environment 114 by a same or a different user. In one example, if the functional path is determined to be a new path, the dependency processor 108 may execute one or more processes to store information about the functional path in combination with the task identified by the activity identification processor 106. The discrepancy processor 108 may store this new path data in the path array 120.

The regression test generator device 102 may additionally include a development monitoring engine 110. The development monitoring engine 110 may be configured to identify software classes utilized by a module being developed for integration into an application running in the production environment 114. Accordingly, the development monitoring engine 110 may monitor code changes implemented within a development environment 116. The development environment 116 may be similar to the production environment 114, and may facilitate changing functionality of one or more applications used within the production environment 114. It is contemplated that any development environment structures may be utilized within the development environment 116, without departing from the scope of these disclosures. For example, the development environment 116 may have version tracking functionality configured to allow various portions of an application running within the production environment to be changed without affecting the functionality of the application within the production environment 114. These changes to the various portions of an application running within the production environment may be stored as a list of one or more software classes changed as a result of the actions undertaken to change the functionality of an application within the development environment 116.

The regression test generator device 102 may additionally include a regression scope engine 112 that is configured to define a scope of a regression test be carried out on an application to be deployed within the production environment 114. The regression scope engine 112 may execute one or more processes to compare one or more software classes identified by the development monitoring engine 110 to one or more software classes stored within the path array 120. Accordingly, the regression scope engine 112 may identify one or more services and/or flows associated with the software classes identified by the development monitoring engine 110, and define a scope of a regression test to carry out on the application in response to identification of a match between software classes identified by the development monitoring engine 110 and the software classes stored in the path array 120. In one example, the regression scope engine may output this regression scope test to a regression tester 118. Accordingly, the regression tester 118 may execute one or more processes to execute a regression test on the identified flows within the regression scope received from the regression scope engine 112. In one example, the regression tester 118 may implement a regression test within the development environment 116 and/or the production environment 114.

Figure 2:
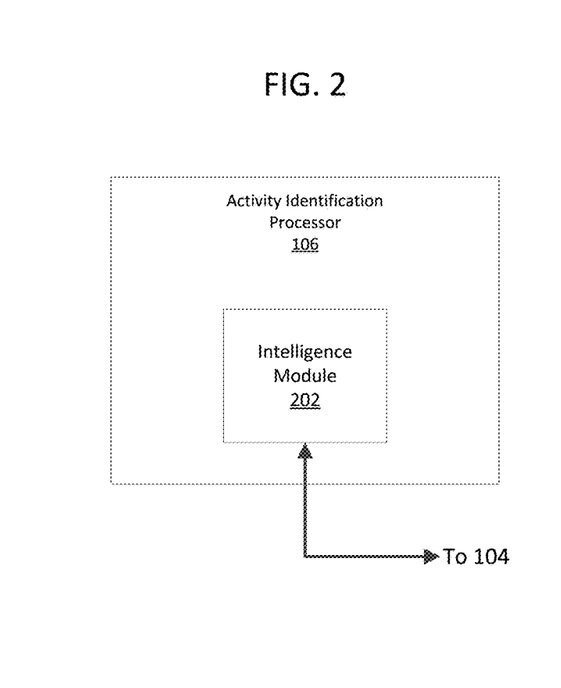
FIG. 2 schematically depicts an activity identification processor, according to one or more aspects described herein.

In one specific implementation, and as schematically depicted in FIG. 2, the activity identification processor 106 may include an intelligence module 202 that is configured to predict an activity of the user interacting with an application of the production environment 114. The intelligence module

202 may implement one or more artificial intelligence processes to predict an activity that a user is intending to carry out within the application of the production environment 114. For example, the intelligence module 202 may execute one or more machine learning processes to receive data from a user's interaction with an application running within the production environment 114, and match this received data to one or more stored data patterns associated with one or more tasks available within the application of the production environment 114.

Advantageously, the intelligence module 202 may be utilized to exclude extraneous information from the data received from the application of the production environment 114 in order to predict a task that a user intends to carry out. For example, a user may follow a chaotic path through various levels of an interface of a software application running within the production environment 114 in an attempt to carry out one or more specific tasks. The intelligence module 202 may be adapted to recognize a pattern from the user data, and identify a known path through the application to accomplish the predicted activity. In certain examples, the intelligence module 202 may not be able to match the observed data to a predicted task or activity associated with an application of the production environment 114. In such instances, the intelligence module 202 may store one or more new, learned tasks associated with the received data. In one example, the learned tasks may be associated with an identifier based upon a destination interface with which a user interacts within an application running in the production environment. Further, the one or more learned tasks may be stored as software paths within a path array 120. Accordingly, the path array 120 of the regression test generator device 102 may be implemented as a database using any data structures and/or formats and using any data management processes. In one example, the intelligence module 202 may access the database of previously stored software paths within the path array 120 in order to match observed user interaction data to a predicted task. The dependency processor 108 may store an identified task within the path array 120 using a flow name that identifies the task associated with the flow through the software application. The artificial intelligence and/or machine learning processes associated with the intelligence module 202 are described in further detail below.

In one example, a framework for machine learning may involve a combination of one or more components, which may include three components: (1) representation, (2) evaluation, and (3) optimization components. Representation components refer to computing units that perform steps to represent knowledge in different ways, including but not limited to: as one or more decision trees, sets of rules, instances, graphical models, neural networks, support vector machines, model ensembles, and/or others. Evaluation components refer to computing units that perform steps to represent the way hypotheses (e.g., candidate programs) are evaluated, including but not limited to as accuracy, prediction and recall, squared error, likelihood, posterior probability, cost, margin, entropy k-L divergence, and/or others. Optimization components refer to computing units that perform steps that generate candidate programs in different ways, including but not limited to combinatorial optimization, convex optimization, constrained optimization, and/or others. In some embodiments, other components and/or sub-components of the aforementioned components may be present in the system to further enhance and supplement the aforementioned machine learning functionality.

Machine learning algorithms sometimes rely on unique computing system structures. Machine learning algorithms may leverage neural networks, which are systems that approximate biological neural networks (e.g., the human brain). Such structures, while significantly more complex than conventional computer systems, are beneficial in implementing machine learning. For example, an artificial neural network may be comprised of a large set of nodes which, like neurons in the brain, may be dynamically configured to effectuate learning and decision-making. Moreover, machine learning tasks are sometimes broadly categorized as either unsupervised learning or supervised learning. In unsupervised learning, a machine learning algorithm is left to generate any output (e.g., to label as desired) without feedback. The machine learning algorithm may teach itself (e.g., observe past output), but otherwise operates without (or mostly without) feedback from, for example, a human administrator.

In an embodiment involving supervised machine learning, a graph module corresponding to an artificial neural network may receive and execute instructions to modify the computational graph. A supervised machine learning model may provide an indication to the graph module that output from the machine learning model was correct and/or incorrect. In response to that indication, the graph module may modify one or more nodes and/or edges to improve output. The modifications to the nodes and/or edges may be based on a prediction, by the machine learning model and/or the graph module, of a change that may result an improvement. The modifications to the nodes and/or edges may be based on historical changes to the nodes and/or edges, such that a change may not be continuously made and unmade (an undesirable trend which may be referred to as oscillation). Feedback may be additionally or alternatively received from an external source, such as an administrator, another computing device, or the like. Where feedback on output is received and used to reconfigure nodes and/or edges, the machine learning model may be referred to as a supervised machine learning model.

In supervised learning, a machine learning algorithm is provided feedback on its output. Feedback may be provided in a variety of ways, including via active learning, semi-supervised learning, and/or reinforcement learning. In active learning, a machine learning algorithm is allowed to query answers from an administrator. For example, the machine learning algorithm may make a guess in a face detection algorithm, ask an administrator to identify the photo in the picture, and compare the guess and the administrator's response. In semi-supervised learning, a machine learning algorithm is provided a set of example labels along with unlabeled data. For example, the machine learning algorithm may be provided a data set of one hundred photos with labeled human faces and ten thousand random, unlabeled photos. In reinforcement learning, a machine learning algorithm is rewarded for correct labels, allowing it to iteratively observe conditions until rewards are consistently earned. For example, for every face correctly identified, the machine learning algorithm may be given a point and/or a score (e.g., "75% correct").

In one example, a machine learning engine may identify relationships between nodes that previously may have gone unrecognized, for example, using collaborative filtering techniques. This realization by the machine learning engine may increase the weight of a specific node; and subsequently spread weight to connected nodes. This may result in particular nodes exceeding a threshold confidence to push those nodes to an updated outcome from a Boolean false to a Boolean true. Other examples of machine learning techniques may be used in combination or in lieu of a collaborative filtering technique.

In addition, one theory underlying supervised learning is inductive learning. In inductive learning, a data representation is provided as input samples data (x) and output samples of the function (f(x)). The goal of inductive learning is to learn a good approximation for the function for new data (x), i.e., to estimate the output for new input samples in the future. Inductive learning may be used on functions of various types: (1) classification functions where the function being learned is discrete; (2) regression functions where the function being learned is continuous; and (3) probability estimations where the output of the function is a probability.

In practice, machine learning systems and their underlying components may be manually tuned by to perform numerous steps to perfect machine learning systems. The process is sometimes iterative and may entail looping through a series of steps: (1) understanding the domain, prior knowledge, and goals; (2) data integration, selection, cleaning, and pre-processing; (3) learning models; (4) interpreting results; and/or (5) consolidating and deploying discovered knowledge. This may further include conferring with domain experts to refine the goals and make the goals clearer, given the nearly infinite number of variables that can possible be optimized in the machine learning system.

In some embodiments, one or more of the processes executed by the intelligence module 202 may use a system of machine learning and/or artificial intelligence to improve accuracy of the determinations made by said device 202. As explained herein, a framework for machine learning may involve a combination of supervised and unsupervised learning models.

Figure 3:
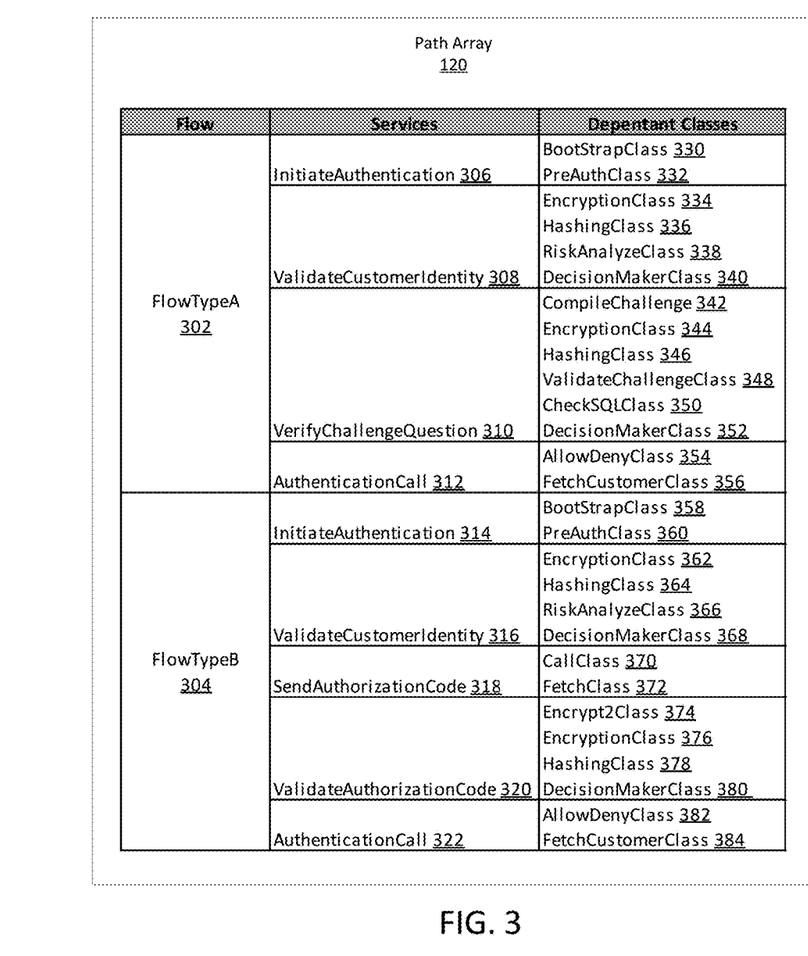
FIG. 3 schematically depicts data structures stored within a path array of a regression test generator device, according to one or more aspects described herein.

FIG. 3 schematically depicts an example of a data structure stored within the path array 120, according to one or more aspects described herein. As previously described, the dependency processor 108 may be configured to store, in the path array 120, a path through an application implemented within the production environment 114. In one example, a path through an application implemented within the production environment 114 may otherwise be referred to as a "flow," whereby a flow is associated with a type of task that a user is able to carry out within an application. A given flow may utilize different services that are implementing the application running within the production environment 114. Further, the services may be made up from different dependent software classes. Accordingly, the dependency processor 108 may store within the path array 120 a flow that identifies a type of task, and one or more services associated with that flow. Additionally, for each of the one or more services, one or more dependent classes may be stored. The regression scope engine 112 may search within the path array 120 for one or more classes identified by the development monitoring engine 110. Further, the regression scope engine 112 may identify one or more software services and flows associated with the classes found within the path array 120. The regression scope engine 112 may output a regression scope corresponding to one or more flows associated with the identified classes that are being modified within the development environment 116. In another example, the regression scope engine 112 may output a regression scope corresponding to one or more services that utilize those one or more classes identified by the development monitoring engine 110, such that the regression may be executed by the regression tester 118 on software services.

FIG. 3 schematically depicts two example flow types 302 and 304 stored within the path array 120. It is contemplated that the path array 120 may store thousands or millions of different flow types in combination with associated services and classes. In the depicted example, services 306-312 are used by FlowTypeA 302 and services 314-322 are used by FlowTypeB 304. Further, dependent software classes 330-356 are used by one or more of the services 306-312 and dependent software classes 358-384 are used by one or more of the services 314-322. In one example, one or more dependent classes may be repeated within the data structure of the path array 120 as multiple different flows and/or services use a same software class. Similarly, one or more services may be repeated within the path array 120 as multiple different flows utilize a same software service module.

In one specific example, the development monitoring engine 110 may identify that an EncryptionClass is being modified within the development environment 116. The regression scope engine 112 may receive data from the development monitoring engine 110 indicating that the EncryptionClass is being modified. In response, the regression scope engine 112 may search through the path array 120 for instances of EncryptionClass. The regression scope engine 112 may identify the EncryptionClass 334 as being used within the ValidateCustomerIdentity 308 service and the VerifyChallengeQuestion 310 service of FlowTypeA 302, and the ValidateCustomerIdentity 316 service and ValidateAuthorizationCode 320 service of FlowTypeB 304. The regression scope engine 112 may define a regression scope that includes each of the services 308, 310, 316, and 320, and/or may define a regression scope that includes all or part of FlowTypeA 302 and/or FlowTypeB 304.

Figure 4:
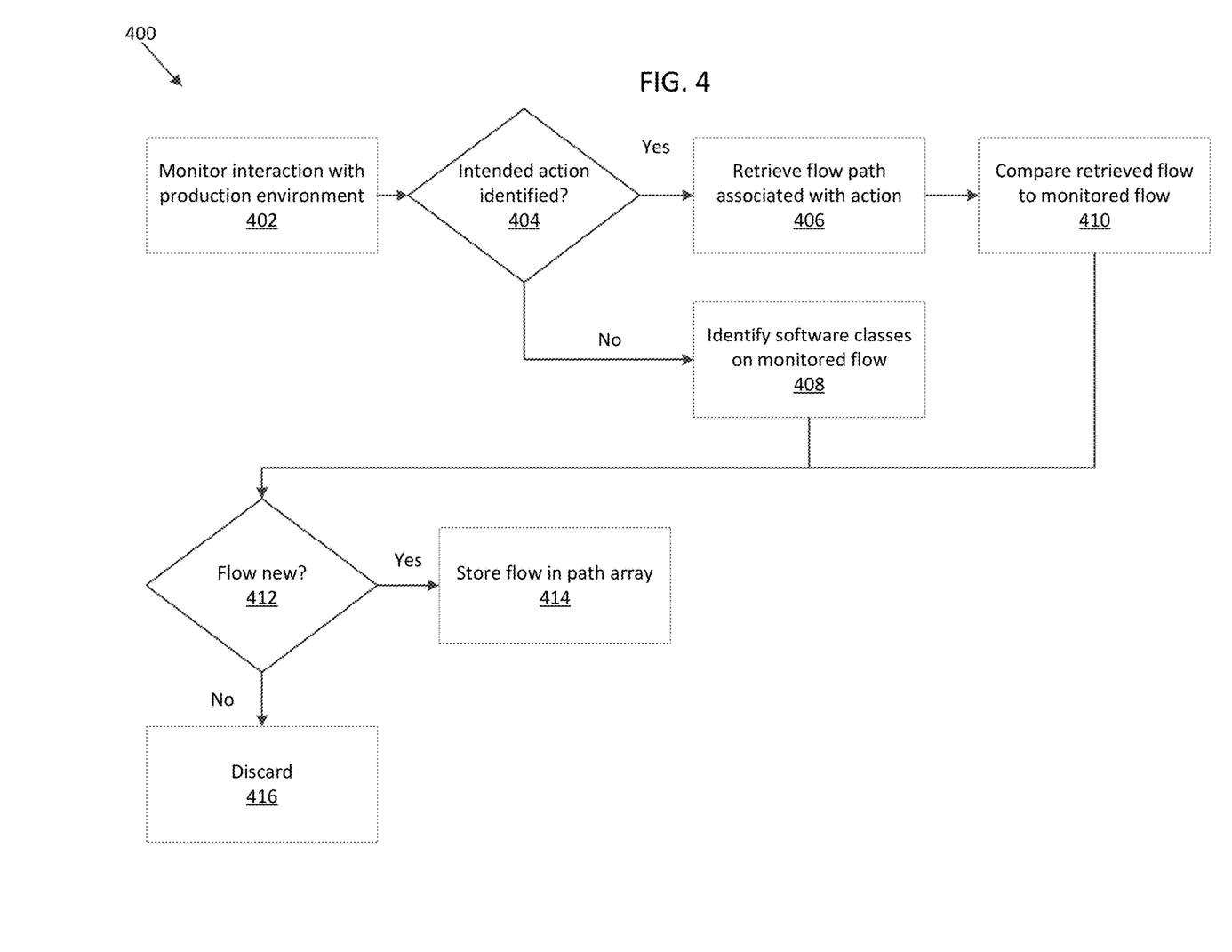
FIG. 4 is a flowchart diagram of a process for storing software flows within a path array, according to one or more aspects described herein.

FIG. 4 is a flowchart diagram 400 of a process for storing new software flows within a path array, as implemented by the regression test generator device 102, according to one or more aspects described herein. One or more processes may be executed at block 402 to monitor one or more users' interaction with a production environment, such as production environment 114. In one specific example, the one or more processes to monitor user interaction with a production environment may be executed by the deployment monitoring engine 104. Decision block 404 may execute one or more processes to determine whether an intended action has been identified. In particular, one or more processes may be executed at decision block 404 to determine whether the activity identification processor 106 has recognized one or more tasks that the user intends to carry out within an application of the production environment 114. This task or activity recognition may be executed by an artificial intelligence process implemented by the intelligence module 202. In another example, one or more tasks may be identified based upon a specific selection of a user within an application, such as a last selection made by the user prior to exiting an application within the production environment 114. If an intended action is identified at decision block 404, flowchart 400 proceeds to block 406. At block 406, one or more processes may be executed to retrieve a flow path associated with the identified action. In particular, the dependency processor 108 may execute one or more processes to identify a path through the software application implemented within the production environment 114 and associated with the identified action that the user intends to perform. One or more processes may be executed at block 410 to compare the retrieved flow to a monitored flow. In particular, the dependency processor 108 may compare the flow associated with the identified action or task to a monitored flow of the user through one or more interfaces of the application implemented within the production environment 114. Advantageously, this comparison of the intended flows to the monitored flow may allow the regression test generator 102 to exclude software classes known to be irrelevant to a task that the user intends to perform. As such, a user may proceed through one or more interfaces of an application implemented within the production environment 114 in an inefficient manner. Block 410 may execute one or more processes to reduce the number of software classes associated with a monitored flow by identifying software classes that are not needed for the intended task.

If an intended action is not identified at decision block 404, flowchart 400 proceeds to block 408. At block 408, one or more processes may be executed to identify software classes on the monitored flow. In particular, the dependency processor 108 may identify software classes accessed by the application implemented within the production environment 114 during a user's interaction with the application. Decision block 412 may execute one or more processes to determine whether an identified flow through an application implemented within the production environment 114 is new and unknown. In one example, these one or more processes to determine the status of the identified flow may be executed by the dependency processor 108 by searching through the stored flows within path array 120. If the identified flow is new, flowchart 400 proceeds to block 414 and the new flow is stored within the path array 120. If, however, the identified flow is not new, it is discarded at block 416.

Figure 5:
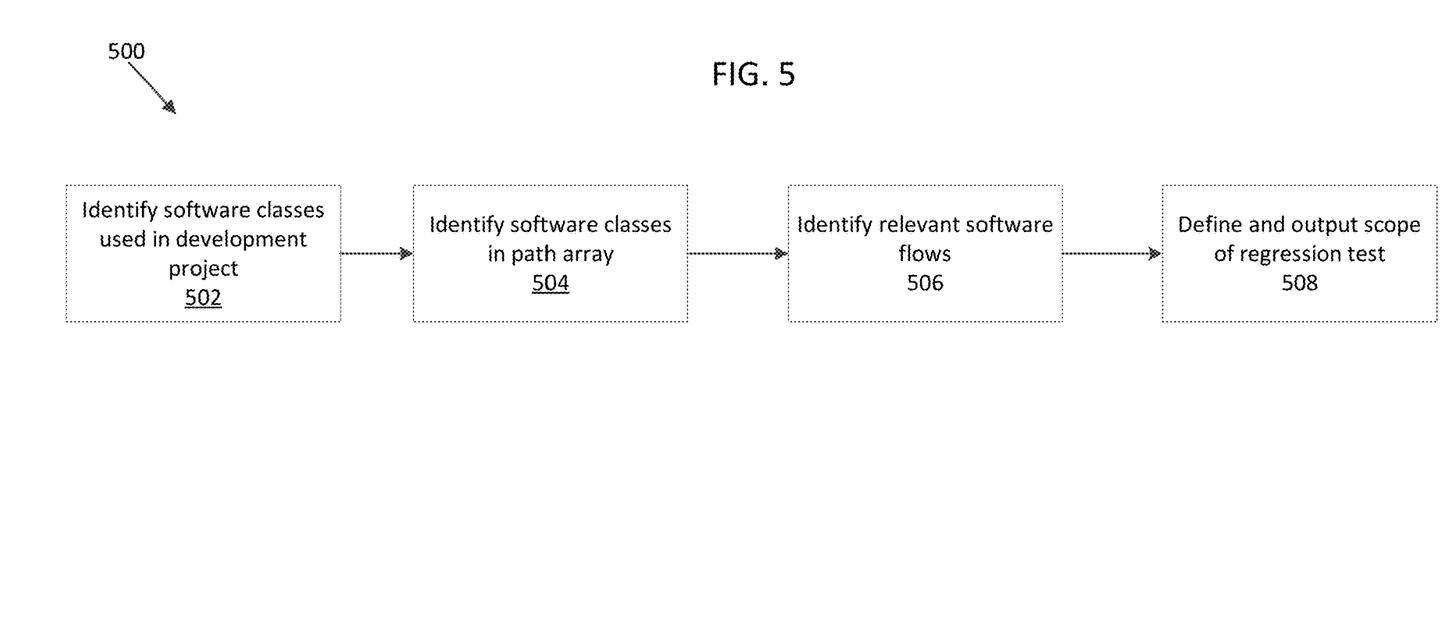
FIG. 5 is a flowchart diagram of a process for defining and outputting a scope of a regression test, according to one or more aspects described herein.

FIG. 5 is a flowchart diagram 500 of a process for defining and outputting a scope of the regression test, according to one or more aspects described herein. In one example, one or more processes may be executed at block 502 to identify one or more software classes used in a development project. These one or more processes may be executed by the development monitoring engine 110 that is configured to monitor changes made within the development environment 116. One or more processes may be executed at block 504 to identify one or more software classes within one or more path arrays associated with the changes made within the development environment 116. Accordingly, the development monitoring engine 110 may identify and store a list of software classes accessed by those elements being changed within the development environment 116. Additionally, one or more processes may be executed at block 506 two identify related software flows. In particular, the development monitoring engine 110 may identify one or more software flows associated with the identified software classes being changed within the development environment 116. The development monitoring engine 110 may identify these relevant software flows by executing one or more search processes through the path array 120. In one example, the development monitoring engine 110 may search for identified software classes, and identify within the path array 120, one or more services and/or flows that should be regression tested. As such, one or more processes may be executed at block 508 to define and output a scope of a regression test that should be implemented on one or more flow and/or service portions of an application. The regression scope engine 112 may output this regression scope to the regression test are 118.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed herein may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

The various elements described throughout this disclosure may be implemented as standalone hardware elements, or as a combination of hardware, firmware, and software components. For example, each of the elements of FIG. 1 may be implemented as standalone hardware elements embodied as application-specific integrated circuits or similar hardware elements. In another example, two or more of the elements of FIG. 1 may be combined together and implemented as dedicated hardware elements. In yet another example, one or more elements of FIG. 1 may be implemented as firmware and/or software modules. Further, one or more of the elements of FIG. 1 may be embodied using a general-purpose or specialized computing system, such as computing system 600 from FIG. 6.

Figure 6:
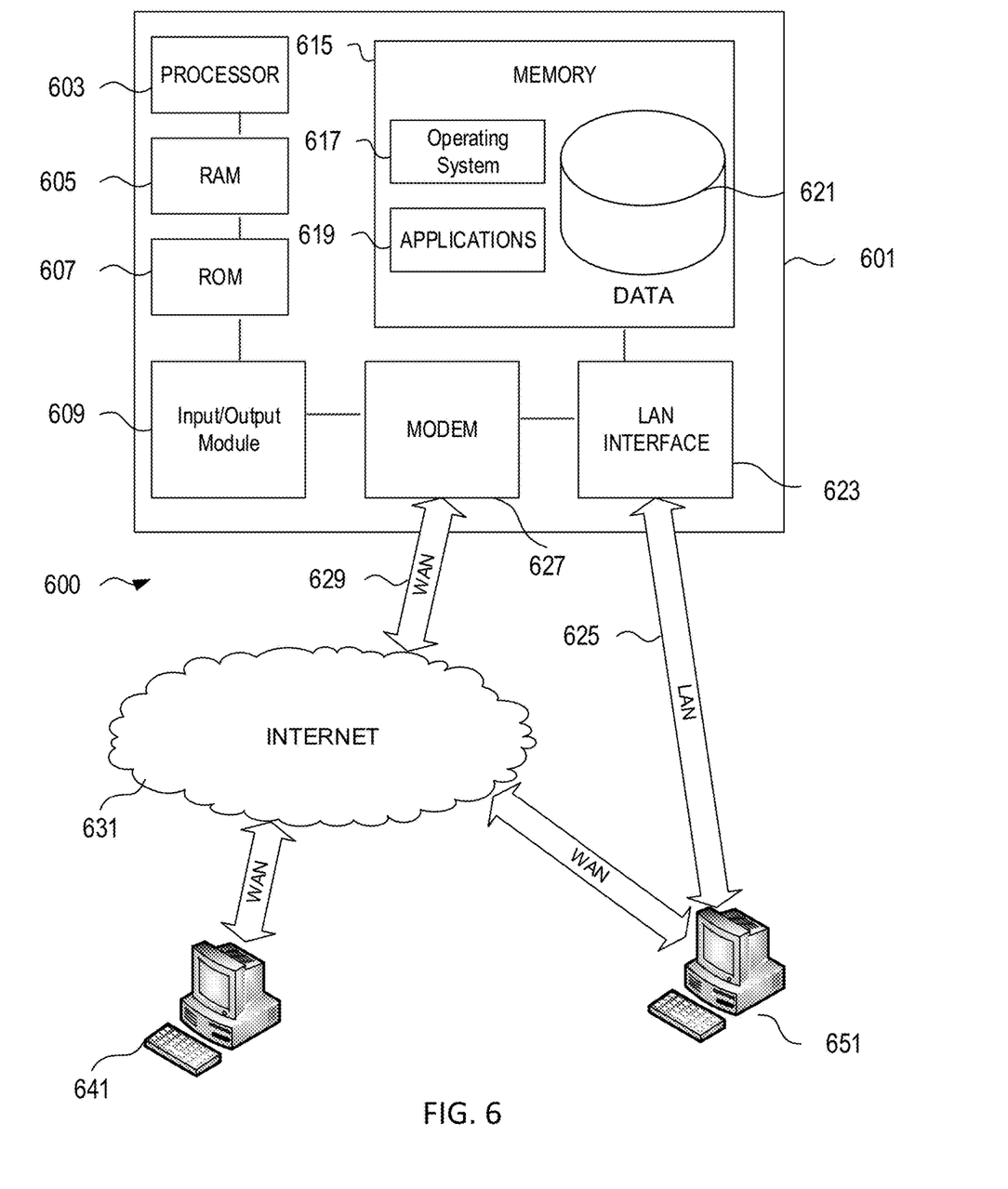
FIG. 6 shows an illustrative operating environment in which various aspects of the disclosure may be implemented, according to one or more aspects described herein.

As such, the regression test generator device 102, or one or more of the modules of the apparatus 102 may be implemented as one or more network-linked computer devices, such as device 601 from FIG. 6. Thus, the regression test generator device 102 may be implemented on consolidated computing hardware, such as computing device 601, at a single geographic location, and/or on a single integrated circuit, and the like. In another example, the regression test generator device 102 may be implemented across multiple computing devices at a common, or dispersed geographic locations. In one example, the device 601 may be in communication with devices 641 and 651 using one or more networking technologies (625, 629, and/or 631) described in further detail in the description that follows.

In one example implementation, computing device 601 may have a processor 603 for controlling overall operation of device 601 and its associated components, including RAM 605, ROM 607, an input/output (I/O) module 609, and memory 615. In one example, as will be apparent to those of ordinary skill in the art, memory 615 may comprise any known form of persistent and/or volatile memory, such as, among others, a hard disk drive, a solid state disk, optical disk technologies (CD-ROM, DVD, Blu-ray, and the like), tape-based stored devices, ROM, and RAM, or combinations thereof. In this way, memory 615 may comprise a non-transitory computer-readable medium that may communicate instructions to processor 603 to be executed.

I/O module 609 may include a microphone, keypad, touch screen, and/or stylus through which a user of the computing device 601 may provide input, and may also include one or more of a speaker for providing audio output and a video display device for providing textual, audiovisual and/or graphical output. Software may be stored within memory 615 and/or storage to provide instructions to the processor 603 for allowing the computing device 601 to perform various functions. For example, memory 615 may store software used by the computing device 601, such as an operating system 617, application programs 619, and an associated database 621. The processor 603 and its associated components may allow the computing device 601 to run a series of computer-readable instructions to process and format data.

The computing device 601 may operate in a networked environment supporting connections to one or more remote computers, such as computing devices 641 and 651. In one example, the computing devices 641 and 651 may be personal computers or servers that include many, or all, of the elements described above relative to the computing device 601. Specifically, the computing device 641 may represent one or more elements of the remote environment 120 and computing device 651 may represent one or more elements of the destination environment 140. Alternatively, computing device 641 and/or 651 may be a data store that is affected by the operation of the computing device 601. The network connections depicted in FIG. 6 include a local area network (LAN) 625 and a wide area network (WAN) 629, but may also include other networks. When used in a LAN networking environment, the computing device 601 is connected to the LAN 625 through a network interface or adapter 623. When used in a WAN networking environment, the computing device 601 may include a modem 627 or other means for establishing communications over the WAN 629, such as the Internet 631. It will be appreciated that the network connections shown are illustrative and other means of establishing a communications link between the computers may be used. In one implementation, the various elements described in relation to the protocol-agnostic file transfer apparatus 102 may be configured to accept inbound networking communications and/or transfer outbound networking communications to one or more networking protocols. These networking protocols may include any of various well-known protocols such as TCP/IP, Ethernet, File Transfer Protocol (FTP), Hypertext Transfer Protocol (HTTP), FTP over SSL (FTPS), HTTP over SSL (HTTPS), SSH File Transfer Protocol (SFTP), Secure Copy (SCP), Web Distributed Authoring and Versioning (WebDAV), Secure Web Distributed Authoring and Versioning (WebDAVS), Trivial File Transfer Protocol (TFTP), Applicability Statement 2 (AS2), Odette File Transfer Protocol (OFTP), and Accelerated File Transfer Protocol (AFTP). Communication between one or more of computing devices 601, 641, and/or 651 may be wired or wireless, and may utilize Wi-Fi, a cellular network, Bluetooth, infrared communication, or an Ethernet cable, among many others.

An application program 619 used by the computing device 601 according to an illustrative embodiment of the disclosure may include computer-executable instructions for invoking functionality related to a protocol-agnostic file transfer apparatus 102. The computing device 601 and/or the other devices 641 or 651 may also be mobile devices, such as smart phones, personal digital assistants (PDAs), and the like, which may include various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, and the like that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

The present disclosures provide technical advantages. In one implementation, the regression test generator device 102 is configured to greatly reduce time needed to manually define the scope of a regression test to one or more software applications. In another example, the regression test generator device 102 facilitates the definition of a regression scope for an environment that would otherwise be too complex to define regression scope beyond a full regression test of the entire code base. Further advantageously, the regression test generator device 102 is able to monitor and define a regression scope in real time, whereby tens, hundreds of thousands, or millions of user interactions with a production environment 114 are monitored and interpreted in in order to define a regression scope. This real-time regression scope definition as previously not possible to do the speed with which users in aggregate are interacting with production environment 114 and the complexity of monitoring flows through one or more applications implemented within the production environment without the use of artificial intelligence to better refine the sub-components of a larger code structure that should be addressed in a regression test. In one example, the regression test generator device 102 achieves this efficiency by defining the scope of the regression tests in real time, and using artificial intelligence to aid in defining the scope and reducing the number of elements within a code base of an application to be tested. The regression test generator device 102 may additionally be used to monitor multiple user's interactions with a same or different applications running within the production environment 114. In certain examples, the regression test generator device 102 may be configured to monitor thousands, tens of thousands, hundreds of thousands, or one million or more users simultaneously accessing applications within the production environment 114. Accordingly, the regression test generator device 102 facilitates identification of data flows through applications that are otherwise to numerous or complex for manual identification, even with the aid of computational processing.

The various embodiments described herein may be implemented by general-purpose or specialized computer hardware. In one example, the computer hardware may comprise one or more processors, otherwise referred to as microprocessors, having one or more processing cores configured to allow for parallel processing/execution of instructions. As such, the various disclosures described herein may be implemented as software coding, wherein those of skill in the computer arts will recognize various coding languages that may be employed with the disclosures described herein. Additionally, the disclosures described herein may be utilized in the implementation of application-specific integrated circuits (ASICs), or in the implementation of various electronic components comprising conventional electronic circuits (otherwise referred to as off-the-shelf components). Furthermore, those of ordinary skill in the art will understand that the various descriptions included in this disclosure may be implemented as data signals communicated using a variety of different technologies and processes. For example, the descriptions of the various disclosures described herein may be understood as comprising one or more streams of data signals, data instructions, or requests, and physically communicated as bits or symbols represented by differing voltage levels, currents, electromagnetic waves, magnetic fields, optical fields, or combinations thereof.

One or more of the disclosures described herein may comprise a computer program product having computer-readable medium/media with instructions stored thereon/therein that, when executed by a processor, are configured to perform one or more methods, techniques, systems, or embodiments described herein. As such, the instructions stored on the computer-readable media may comprise actions to be executed for performing various steps of the methods, techniques, systems, or embodiments described herein. Furthermore, the computer-readable medium/media may comprise a storage medium with instructions configured to be processed by a computing device, and specifically a processor associated with a computing device. As such the computer-readable medium may include a form of persistent or volatile memory such as a hard disk drive (HDD), a solid state drive (SSD), an optical disk (CD-ROMs, DVDs), tape drives, floppy disk, ROM, RAM, EPROM, EEPROM, DRAM, VRAM, flash memory, RAID devices, remote data storage (cloud storage, and the like), or any other media type or storage device suitable for storing data thereon/therein. Additionally, combinations of different storage media types may be implemented into a hybrid storage device. In one implementation, a first storage medium may be prioritized over a second storage medium, such that different workloads may be implemented by storage media of different priorities.

Further, the computer-readable media may store software code/instructions configured to control one or more of a general-purpose, or a specialized computer. Said software may be utilized to facilitate interface between a human user and a computing device, and wherein said software may include device drivers, operating systems, and applications. As such, the computer-readable media may store software code/instructions configured to perform one or more implementations described herein.

Those of ordinary skill in the art will understand that the various illustrative logical blocks, modules, circuits, techniques, or method steps of those implementations described herein may be implemented as electronic hardware devices, computer software, or combinations thereof. As such, various illustrative modules/components have been described throughout this disclosure in terms of general functionality, wherein one of ordinary skill in the art will understand that the described disclosures may be implemented as hardware, software, or combinations of both.

The one or more implementations described throughout this disclosure may utilize logical blocks, modules, and circuits that may be implemented or performed with a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The techniques or steps of a method described in connection with the embodiments disclosed herein may be embodied directly in hardware, in software executed by a processor, or in a combination of the two. In some embodiments, any software module, software layer, or thread described herein may comprise an engine comprising firmware or software and hardware configured to perform embodiments described herein. Functions of a software module or software layer described herein may be embodied directly in hardware, or embodied as software executed by a processor, or embodied as a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read data from, and write data to, the storage medium. In the alternative, the storage medium may be integral to the processor. The processor and the storage medium may reside in an ASIC. The ASIC may reside in a user device. In the alternative, the processor and the storage medium may reside as discrete components in a user device.

In one aspect, this disclosure includes a regression test generator device that has a deployment monitoring engine that is configured to monitor a user's interaction with a production environment of an application. The deployment monitoring engine may also include an activity identification processor that is configured to identify a task that the user is intending to carry out within the application. The deployment monitoring engine may additionally include a dependency processor that is configured to identify dependent software classes utilized during the user's interaction with the production environment, and to store in a path array, in response to determining that the functional path is new, information about the functional path in combination with the task identified by the activity identification processor. The regression test generator device may additionally include a development monitoring engine that is configured to identify software classes used by the module being developed for integration into the application and the production environment. The regression test generator device may also include a regression scope engine that is configured to compare the software classes identified the development monitoring engine to the software classes in the path array and two define a scope of a regression test to be carried out on the application in response to an identification of a match between software classes identified by the development monitoring engine and software classes stored in the path array.

In one example, the deployed monitoring engine is configured to monitor the user's interaction with the production environment in real time.

The deployed monitoring engine is configured to monitor over 1 million unique users' interactions with the production environment simultaneously.

The activity identification processor is configured to identify a task that the user intends to carry out within the software application using a machine learning module, otherwise referred to as an intelligence module.

The machine learning module may identify a known path through the production environment to carry out the identified task.

The machine learning module identifies one or more software classes on the known path through the production environment use to carry out the identified task.

In one example, the dependency processor determines whether the functional path followed through the identified software classes is new, and makes this determination by comparing the functional path followed to the known path identified by the machine learning module.

The machine learning module may exclude one or more software classes from data received from the production environment by identifying an intended action to be carried out within the production environment, and one or more extraneous actions taken by the user when trying to carry out the intended action.

The path array stores a functional path that includes a list of software classes used during the identified task that the user intends to carry out.

The regression scope engine is further configured to store the scope of the regression test is a list of one or more software flows and output the scope of the regression test to a regression test module.

In another aspect, a regression test generator device includes a processor, and a non-transitory computer-readable medium that has computer-executable instructions that, when executed by the processor, are configured to monitor a user's interaction with the production environment of an application, and identify a task that the user intends to carry out within the application. The processor may also be configured to identify dependent software classes utilized during the user's interaction with the production environment, determine whether a functional path followed through the identified software classes utilized during the user's interaction with the production environment is new, and store in a path array, in response to determining that the functional path is new, information about the functional path in combination with the task identified. The processor may also be configured to identify software classes utilized by a module being developed for integration into the application and the production environment, compared the software classes identified to the software classes in the path array, and define a scope of a regression test be carried out on the application in response to an identification of a match between software classes identified by the development monitoring engine and software classes stored in the path array.

The processor may also be configured to monitor the user's interaction with the production environment in real time, and/or monitor over 1 million unique users' interactions with the production environment simultaneously.

The processor may also be configured to identify a task that the user intends to carry out within the software application, using a machine learning module, otherwise referred to as an intelligence module.

The machine learning module may identify a known path through the production environment to carry out the identified task, and may identify one or more software classes utilized on the known path through the production environment to carry out the identified task.

The processor may also be configured to determine whether the functional path followed through the identified software classes is new, by comparing the functional path followed to the known path identified by a machine learning module.

The bathroom a store a functional path that includes a list of software classes used during an identified task.

The processor may be configured to store the scope of the regression test is a list of one or more software flows and output the scope of the regression test were regression test module.

A method for regression test generation may include monitoring a user's interaction with the production environment of an application, identifying a task that the user intends to carry out within the application, and identify dependent software classes utilized during the use interaction with the production environment. The method may also include determining whether a functional path followed through the identified software classes utilized during the user's interaction with the production environment is new, and storing in a path array, in response to determining that the functional path is new, information about the functional path in combination with the task identified. Method may also include identifying software classes utilized by a module being developed for integration into the application in the production environment, and comparing the software classes identified to the software classes in the path array. The method may also include defining a scope of a regression test be carried out on the application in response to an identification of a match between the software classes identified by the development monitoring engine and the software classes stored in the path array.

In one example, the monitoring of the user's interaction with the production environment is carried out in real time.

Accordingly, it will be understood that the invention is not to be limited to the embodiments disclosed herein, but is to be understood from the following claims, which are to be interpreted as broadly as allowed under the law.

What is claimed is:

1. A regression test generator device comprising:
a deployment monitoring engine implemented as an application-specific integrated circuit hardware element, configured to monitor a user's interaction with a production environment of an application, the deployment monitoring engine further comprising:
an activity identification processor, configured to identify a task that a user intends to carry out within the application; and
a dependency processor, configured to:
identify dependent software classes utilized during the user's interaction with the production environment;
determine whether a functional path followed through the identified software classes utilized during the user's interaction with the production environment is new; and
store in a path array, in response to determining that the functional path is new, information about the functional path in combination with the task identified by the activity identification processor;
a development monitoring engine implemented as an application-specific integrated circuit hardware element, configured to identify software classes utilized by a module being developed for integration into the application in the production environment;
a regression scope engine implemented as an application-specific integrated circuit hardware element, configured to:
compare the software classes identified by the development monitoring engine to software classes in the path array; and
define a scope of a regression test to be carried out on the application in response to an identification of a match between software classes identified by the development monitoring engine and software classes stored in the path array.

2. The regression test generator device of claim 1, wherein the deployment monitoring engine is configured to monitor the user's interaction with the production environment in real time.

3. The regression test generator device of claim 1, wherein the deployment monitoring engine is configured to monitor over 1 million unique users' interactions with the production environment simultaneously.

4. The regression test generator device of claim 1, wherein the activity identification processor is configured to identify, using a machine learning module, a task that a user intends to carry out within the production environment.

5. The regression test generator of claim 4, wherein the machine learning module identifies a known path through the production environment to carry out the identified task.

6. The regression test generator device of claim 5, wherein the machine learning module identifies one or more software classes utilized on the known path through the production environment to carry out the identified task.

7. The regression test generator device of claim 6, wherein the dependency processor determines whether the functional path followed through the identified software classes is new by comparing the functional path followed to the known path identified by the machine learning module.

8. The regression test generator device of claim 1, wherein the path array stores a functional path comprising a list of software classes used during the identified task.

9. The regression test generator device of claim 1, wherein the regression scope engine is further configured to:
store the scope of the regression test as a list of one or more software flows; and
output the scope of the regression test to a regression test module.

10. A regression test generator device comprising:
a processor;
a non-transitory computer-readable medium comprising computer-executable instructions that, when executed by the processor, are configured to:
monitor a user's interaction with a production environment of an application;
identify a task that a user intends to carry out within the application;
identify dependent software classes utilized during the user's interaction with the production environment;
determine whether a functional path followed through the identified software classes utilized during the user's interaction with the production environment is new;
store in a path array, in response to determining that the functional path is new, information about the functional path in combination with the task identified;
identify, using a development monitoring engine implemented as an application-specific integrated circuit hardware element, software classes utilized by a module being developed for integration into the application in the production environment;
compare, using a regression scope engine implemented as an application-specific integrated circuit hardware element, the software classes identified to software classes in the path array; and
define, using the regression scope engine, a scope of a regression test to be carried out on the application in response to an identification of a match between identified software classes and software classes stored in the path array.

11. The regression test generator device of claim 10, wherein the non-transitory computer-readable medium comprises computer-executable instructions that when executed by the processor are further configured to:
monitor the user's interaction with the production environment in real time.

12. The regression test generator device of claim 10, wherein the non-transitory computer-readable medium comprises computer-executable instructions that when executed by the processor are further configured to:
monitor over 1 million unique users' interactions with the production environment simultaneously.

13. The regression test generator device of claim 10, wherein the non-transitory computer-readable medium comprises computer-executable instructions that when executed by the processor are further configured to:
identify, using a machine learning module, a task that a user intends to carry out in a software application within the production environment.

14. The regression test generator device of claim 13, wherein the machine learning module identifies a known path through the production environment to carry out the identified task.

15. The regression test generator of claim 14, wherein the machine learning module identifies one or more software classes utilized on the known path through the production environment to carry out the identified task.

16. The regression test generator device of claim 15, wherein the non-transitory computer-readable medium comprises computer-executable instructions that when executed by the processor are further configured to:

determine whether the functional path followed through the identified software classes is new by comparing the functional path followed to the known path identified by the machine learning module.

17. The regression test generator device of claim 10, wherein the path array stores a functional path comprising a list of software classes used during the identified task.

18. The regression test generator device of claim 10, wherein the non-transitory computer-readable medium comprises computer-executable instructions that when executed by the processor are further configured to:
  store the scope of the regression test as a list of one or more software flows; and
  output the scope of the regression test to a regression test module.

19. A method for regression test generation, comprising:
  monitoring a user's interaction with a production environment of an application;
  identifying a task that a user intends to carry out within the application;
  identifying dependent software classes utilized during the user's interaction with the production environment;
  determining whether a functional path followed through the identified software classes utilized during the user's interaction with the production environment is new;
  storing in a path array, in response to determining that the functional path is new, information about the functional path in combination with the task identified;
  identifying, using a development monitoring engine implemented as an application-specific integrated circuit hardware element, software classes utilized by a module being developed for integration into the application in the production environment;
  comparing, using a regression scope engine implemented as an application-specific integrated circuit hardware element, the software classes identified to software classes in the path array; and
  defining, using the regression scope engine, a scope of a regression test to be carried out on the application in response to an identification of a match between identified software classes and software classes stored in the path array.

20. The method of claim 19, wherein the monitoring of the user's interaction with the production environment is carried out in real time.

* * * * *